US008517830B2

(12) United States Patent
Morrow et al.

(10) Patent No.: US 8,517,830 B2

(45) **Date of Patent: *Aug. 27, 2013**

(54) USER INTERFACE SYSTEM AND METHOD FOR A GAMING MACHINE

(75) Inventors: James W. Morrow, Sparks, NV (US); Carmen DiMichele, Sparks, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 3 days.

This patent is subject to a terminal disclaimer.

(21) Appl. No.: 13/110,744

(22) Filed: May 18, 2011

(65) Prior Publication Data

US 2011/0218040 A1 Sep. 8, 2011

Related U.S. Application Data

(63) Continuation of application No. 10/943,771, filed on Sep. 16, 2004, now Pat. No. 7,950,999.

(51) Int. Cl.
*A63F 13/00* (2006.01)

(52) U.S. Cl.
USPC .............................................. 463/31; 463/16

(58) Field of Classification Search
USPC ......................................... 463/16, 20, 40–42
See application file for complete search history.

(56) References Cited

U.S. PATENT DOCUMENTS

| | | | |
|---|---|---|---|
| 3,662,105 | A | 5/1972 | Hurst et al. |
| 4,448,419 | A | 5/1984 | Telnaes |
| 4,676,506 | A | 6/1987 | Crouch |
| 4,718,672 | A | 1/1988 | Okada |
| 4,837,728 | A | 6/1989 | Barrie et al. |
| 4,856,787 | A | 8/1989 | Itkis |
| 5,429,361 | A | 7/1995 | Raven et al. |
| 5,655,961 | A | 8/1997 | Acres et al. |

(Continued)

FOREIGN PATENT DOCUMENTS

| | | |
|---|---|---|
| AU | 704691 | 4/1997 |
| CA | 2468056 | 6/2003 |

(Continued)

OTHER PUBLICATIONS

Hong-Taek Ju; Mi-Jung Choi; Sehee Han; Yunjung Oh; Jeong-Hyuk Yoon; Hyojin Lee; Hong, J.W., "An embedded Web server architecture for XML-based network management," Network Operations and Management Symposium, 2002. NOMS 2002. 2002 IEEE/IFIP , vol., No., pp. 5-18, 2002 http://citeseerx.ist.psu.edu/viewdoc/download?doi=10.1.1.107.7189&rep=rep1&type=p.*

*Primary Examiner* — Ronald Laneau
*Assistant Examiner* — Ross Williams
(74) *Attorney, Agent, or Firm* — Brooke Quist; Marvin Hein

(57) ABSTRACT

An embedded user interface includes a display screen and an embedded processor, and is incorporated into a gaming machine that in turn includes a gaming screen and a gaming processor. The embedded processor employs an internal operating system and communicates with the gaming processor. The embedded processor reads incoming data, translates the data into a web authoring language, and maps the data to the web page display screen. The display screen presents web page information to a user via the display screen, thereby increasing user excitement by providing a richer gaming experience. This provides a dramatic improvement over traditional system components (input/output peripherals) that have been used in the past to access service and system information, such as a 2-line, 20-character VF display and a 12-digit keypad.

20 Claims, 9 Drawing Sheets

(56) References Cited

U.S. PATENT DOCUMENTS

| | | | | |
|---|---|---|---|---|
| 5,702,304 | A | 12/1997 | Acres et al. | |
| 5,741,183 | A | 4/1998 | Acres et al. | |
| 5,752,882 | A | 5/1998 | Acres et al. | |
| 5,759,102 | A | 6/1998 | Pease et al. | |
| 5,769,716 | A | 6/1998 | Saffari et al. | |
| 5,770,533 | A | 6/1998 | Franchi | |
| 5,779,545 | A | 7/1998 | Berg et al. | |
| 5,796,389 | A | 8/1998 | Bertram et al. | |
| 5,809,482 | A | 9/1998 | Strisower | |
| 5,816,918 | A | 10/1998 | Kelly et al. | |
| 5,820,459 | A | 10/1998 | Acres et al. | |
| 5,833,536 | A | 11/1998 | Davids et al. | |
| 5,833,540 | A | 11/1998 | Miodunski et al. | |
| 5,836,817 | A | 11/1998 | Acres et al. | |
| 5,851,148 | A | 12/1998 | Brune et al. | |
| 5,876,284 | A | 3/1999 | Acres et al. | |
| 5,885,158 | A | 3/1999 | Torango et al. | |
| 5,919,091 | A | 7/1999 | Bell et al. | |
| 5,967,896 | A | 10/1999 | Jorasch et al. | |
| 5,973,696 | A | 10/1999 | Agranat et al. | |
| 5,984,779 | A | 11/1999 | Bridgeman et al. | |
| 6,008,784 | A | 12/1999 | Acres et al. | |
| 6,010,404 | A | 1/2000 | Walker et al. | |
| 6,068,552 | A | 5/2000 | Walker et al. | |
| 6,071,190 | A | 6/2000 | Weiss et al. | |
| 6,077,163 | A | 6/2000 | Walker et al. | |
| 6,110,041 | A | 8/2000 | Walker et al. | |
| 6,113,495 | A | 9/2000 | Walker et al. | |
| 6,135,884 | A | 10/2000 | Hedrick et al. | |
| 6,162,122 | A | 12/2000 | Acres et al. | |
| 6,244,958 | B1 | 6/2001 | Acres | |
| 6,254,483 | B1 | 7/2001 | Acres | |
| 6,257,981 | B1 | 7/2001 | Acres et al. | |
| 6,280,328 | B1 | 8/2001 | Holch et al. | |
| 6,302,790 | B1 | 10/2001 | Brossard | |
| 6,312,333 | B1 | 11/2001 | Acres | |
| 6,319,125 | B1 | 11/2001 | Acres | |
| 6,332,099 | B1 | 12/2001 | Heidel et al. | |
| 6,364,768 | B1 | 4/2002 | Acres et al. | |
| 6,364,769 | B1 | 4/2002 | Weiss et al. | |
| 6,371,852 | B1 | 4/2002 | Acres | |
| 6,375,567 | B1 | 4/2002 | Acres | |
| 6,375,569 | B1 | 4/2002 | Acres | |
| 6,431,983 | B2 | 8/2002 | Acres | |
| 6,457,099 | B1 | 9/2002 | Gilbert | |
| RE37,885 | E | 10/2002 | Acres | |
| 6,565,434 | B1 | 5/2003 | Acres | |
| 6,607,441 | B1 | 8/2003 | Acres | |
| 6,712,697 | B2 | 3/2004 | Acres | |
| 6,712,698 | B2 | 3/2004 | Paulsen et al. | |
| 6,722,985 | B2 | 4/2004 | Criss-Puszkiewicz | |
| 6,722,986 | B1 | 4/2004 | Lyons et al. | |
| 6,800,030 | B2 | 10/2004 | Acres | |
| 6,832,958 | B2 | 12/2004 | Acres et al. | |
| 6,910,964 | B2 | 6/2005 | Acres | |
| 6,916,247 | B2 * | 7/2005 | Gatto et al. | 463/42 |
| RE38,812 | E | 10/2005 | Acres et al. | |
| 7,043,641 | B1 * | 5/2006 | Martinek et al. | 713/187 |
| D531,333 | S | 10/2006 | Acres et al. | |
| 2001/0016519 | A1 | 8/2001 | Choe | |
| 2002/0065136 | A1 * | 5/2002 | Day | 463/42 |
| 2002/0111206 | A1 | 8/2002 | Van Baltz | |
| 2002/0183105 | A1 | 12/2002 | Cannon et al. | |
| 2003/0060247 | A1 | 3/2003 | Goldberg et al. | |
| 2003/0100372 | A1 | 5/2003 | Gatto et al. | |
| 2004/0002378 | A1 | 1/2004 | Acres et al. | |
| 2004/0002383 | A1 | 1/2004 | Lundy et al. | |
| 2004/0100490 | A1 | 5/2004 | Boston et al. | |
| 2004/0142750 | A1 | 7/2004 | Glisson et al. | |
| 2005/0141509 | A1 | 6/2005 | Rabbie et al. | |

FOREIGN PATENT DOCUMENTS

| | | |
|---|---|---|
| EP | 0769769 | 4/1997 |
| JP | 2002-529840 A | 9/2002 |
| JP | 2004-199550 A | 7/2004 |
| WO | 2004/024260 | 3/2004 |

* cited by examiner

USER INTERFACE SYSTEM AND METHOD FOR A GAMING MACHINE

CROSS-REFERENCE TO RELATED APPLICATIONS

This application is a continuation of U.S. patent application Ser. No. 10/943,771, filed Sep. 15, 2004, which is herein incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD

The disclosed embodiments relate generally to a gaming system that incorporates an additional user interface, and more particularly, to a system and methodology that integrates an additional user interface having an animation capable display screen into a gaming machine.

BACKGROUND

Traditionally, gaming machines have been designed for gaming purposes only. In this regard, gaming machines have been constructed only to include gaming functionality. Recently, however, casino owners have become aware that by adding additional features to gaming machines, they may be able to maintain a player's attention to the gaming machines for longer periods of time. This, in turn, leads to the player wagering at the gaming machine for longer periods of time, thereby increasing casino profits.

One technique that has been employed to maintain a player's attention at the gaming machine has been to provide players with access to gambling-related information. By attaching a small electronic display to the gaming device, gambling-related information, as well as news and advertisements can be sent to the player. The gambling-related information may include, for example, information on sports betting and betting options for those sporting events. Additionally, the gambling-related information may also include information such as horse racing and off-track betting. News and advertisements can also maintain a player's attention by providing the player with access to information ranging from show times, to restaurant and hotel specials, and to world events, thus reducing the need and/or desire for the player to leave the gaming machine.

Moreover, it would be desirable to provide the player with interactive access to the above information. This type of interactivity would allow players significantly more flexibility to make use of the above-described information. The gambling-related information could also be utilized by the player in a much more efficient manner. In this regard, greater levels of flexibility and access are likely to make a player remain and gamble at the gaming machine for significantly longer periods of time. Unfortunately, the system components that are currently utilized for displaying and accessing this type of information, such as external keypads and display modules, are extremely limited in the functionality and capabilities that they provide, thus limiting the success of their ability to maintain a player's attention.

As stated above, attempts to distribute gambling-related information and advertisements to players, has typically required additional system components to be attached to the gaming devices separately and apart from the construction of the gaming machine itself. Specifically, these components for accessing and displaying information from gaming machines have been extremely limited in their usefulness because of the lack of capabilities inherent in these components. Such components have generally included a keypad, card reader, and display equipment, such as a 2-line LED display. It would be desirable for these components to be integrated into the gaming device itself, in a more unified fashion to provide substantially greater functionality than that which has been previously available.

Accordingly, those skilled in the art have long recognized the need for a system that is capable of integrating expanded service and systems capabilities with the more traditional function of a gaming device. The claimed invention clearly addresses these and other needs.

SUMMARY

Briefly, and in general terms, the disclosed embodiments resolves the above and other problems by providing a user interface system for use in a gaming machine, wherein the gaming machine includes a gaming presentation and a gaming processor. More particularly, the user interface system includes: a display screen, a dictionary component, and a processor that employs an internal operating system and communicates with the gaming processor. The display screen presents information to a user via the display screen. The dictionary component translates an incoming text data message directed to be displayed to a player upon a display screen into an XML, HTML, or DHTML enhanced player message directed to be displayed to the player upon the display screen. The embedded processor reads the incoming text data message directed to be displayed to the player upon the display screen and calls the dictionary component that enables display of the translated XML, HTML, or DHTML enhanced player message directed to be displayed to the player upon the display screen.

In accordance with another preferred embodiment, a method for increasing user excitement relating to a gaming machine by providing an enhanced display of information to a user is disclosed. The method includes: providing an embedded user interface that is incorporated into a gaming machine, wherein the embedded user interface includes an additional processor and a display screen that are separate from the gaming presentation and gaming processor of the gaming machine; receiving an incoming text data message at the user interface directed to be displayed to a player upon the display screen of the user interface; using a dictionary component and the additional processor of the user interface to translate the incoming text data message directed to be displayed to the player upon the display screen of the user interface into an XML, HTML, or DHTML enhanced player message; and displaying the translated XML, HTML, or DHTML enhanced player message directed to be displayed to the player upon the display screen of the user interface, wherein the display screen presents the translated XML, HTML, or DHTML enhanced player message to the player via the display screen.

Other features and advantages of the claimed invention will become apparent from the following detailed description when taken in conjunction with the accompanying drawings, which illustrate by way of example, the features of the claimed invention.

DETAILED DESCRIPTION OF THE PREFERRED EMBODIMENT

A preferred embodiment of the embedded additional user interface, constructed in accordance with the disclosed embodiments, is directed towards the integration of an embedded additional user interface into a gaming machine to increase user excitement by providing a richer gaming experience. The embedded additional user interface provides enhanced player satisfaction and excitement, as well as improved gaming device reliability, interactivity, flexibility, security, and accountability. The user interface is sometimes referred to herein as "additional" in that the user interface is separate from the gaming screen (or other gaming presentation). Further, the user interface is sometimes referred to herein as "embedded" in that the user interface includes its own processor in some preferred embodiments.

Figure 1:
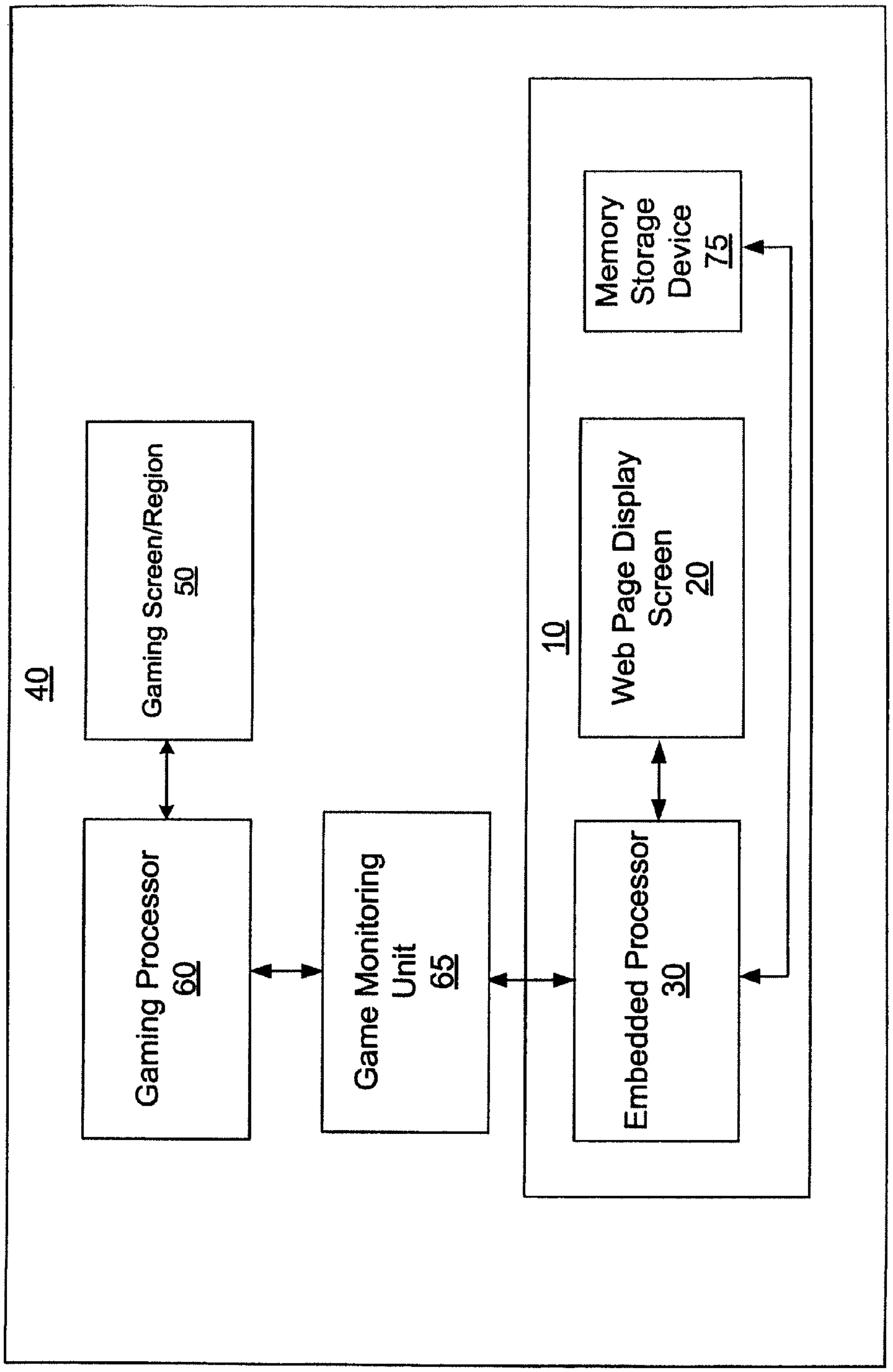
FIG. 1 illustrates a relational diagram of an embedded user interface, constructed in accordance with the disclosed embodiments, utilizing a display screen and an embedded processor that receives data messages from a game monitoring unit that are translated into web page content and mapped to the display screen.

Referring now to the drawings, wherein like reference numerals denote like or corresponding parts throughout the drawings and, more particularly to FIGS. 1-5, there is shown one embodiment of an embedded additional user interface 10. Specifically, FIG. 1 shows an embedded additional user interface 10 that includes a web page display screen 20 and an embedded processor 30. The user interface 10 is incorporated into a gaming machine 40 that, in turn, includes a gaming screen 50, (and/or non-screen gaming region 50, e.g., spinning reels or other gaming presentation) gaming processor 60, and a game monitoring unit 65. The embedded processor 30 employs an internal operating system and communicates with the gaming processor 60. The embedded processor 30 reads incoming data, translates the data into a web authoring language, and maps the data to the web page display screen 20. The display screen 20 presents web page information to a user via the display screen, thereby increasing user excitement by providing a richer gaming experience. The game monitoring unit 65 monitors the information that is input through the user interface 10. This provides a dramatic improvement over traditional system components 70 (input/output peripherals, such as 2-line, 20 character VF (Vacuum Fluorescent) displays and 12-digit keypads) that have been used as in the past to provide user information. The user interface 10 communicates with the game monitoring unit 65 in the same manner as the previous system components 70 communicated with the game monitoring unit.

Figure 2:
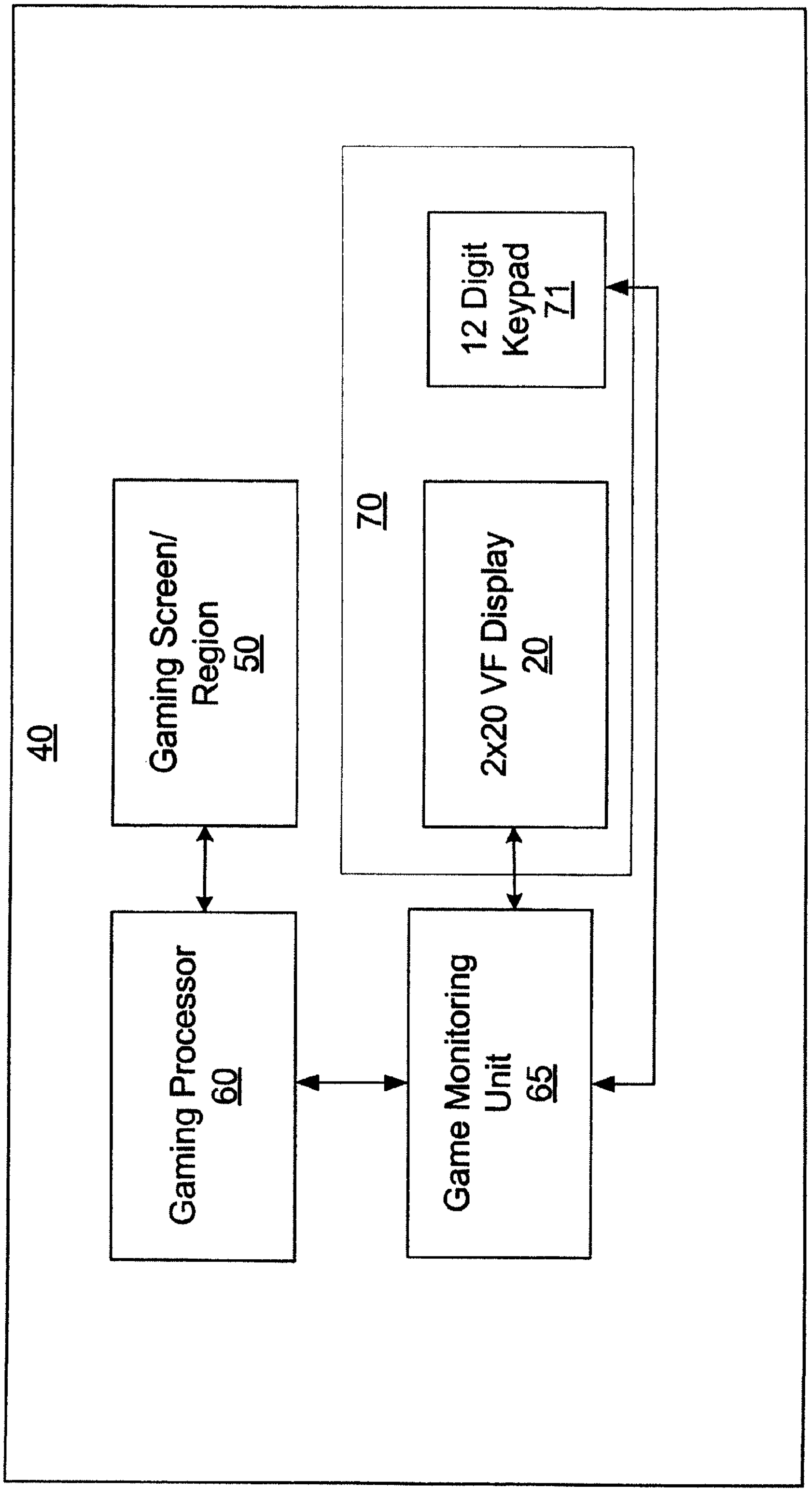
Fig. 2 (Prior Art)
FIG. 2 illustrates a relational diagram of a prior art gaming system that utilizes a 2×20 VF display and 12-digit keypad.

As shown in FIG. 2, prior art gaming devices typically utilized a single video display screen as a gaming screen 50 for the gaming machine 40, while additional system components 70 were attached or juxtapositioned next to the gaming machine. However, in a preferred embodiment, the system components 70 that were used in prior art systems are replaced with the embedded additional user interface 10 to provide the advanced functionality of a web page display screen 20. Such functionality includes, by way of example only, and not by way of limitation, the ability to display animation, multimedia, and other web-type content. The embedded additional user interface 10 enables presentation of additional information (e.g., enhanced player information) to a player (or potential player) through the web page display screen 20 in an exciting, eye-catching format, while not interfering with the normal gaming processes being displayed on the gaming screen 50. Further, the embedded additional user interface 10 does not interfere with the normal gaming hardware in the gaming machine 40, but rather is easily integrated into a gaming machine 40.

Referring again to FIG. 1, in situations involving multiple gaming machine (or gaming component) manufactures, an embedded additional user interface 10 can be incorporated into a gaming machine (either originally or by retrofitting) without requiring access to the game logic or other gaming systems that might be proprietary and inaccessible with a gaming machine from another gaming manufacturer. Thus, in a preferred embodiment, the embedded additional user interface 10, which includes a web page display screen 20 for presenting supplementary information to a player, is incorporated into a gaming machine 40 in addition to the standard gaming screen 50 typically found in a gaming machine. The embedded additional user interface 10 may also be incorporated into a gaming machine 40 that utilizes a gaming region (e.g., a reel-spinner) instead of a standard gaming screen 50. This supplemental information may include general gaming information, player-specific information, player excitement and interest captivation content, advertising content (targeted or otherwise), and the like. Further, in other preferred embodiments, the embedded additional user interface 10 may have the ability to interact with the game logic of the gaming processor 60, and thus, provide further functionality, such as bonus games and/or the ability to incorporate awards, promotional offers, or gifts from the web page display screen 20 to the gaming screen 50. Moreover, the web page display screen 20 may display supplemental information in an "attract mode" when there is no game play occurring.

In a preferred embodiment, the embedded additional user interface 10 is used to make casino services more accessible and friendly to casino patrons. In one preferred embodiment, the embedded additional user interface 10 is designed to interface with the hardware configuration of game platforms currently employed in an existing gaming communication systems network, thus decreasing implementation costs for the casino. A standard gaming network interface to the systems network, such as a Mastercom system, includes a multi-drop bus method of communicating to a keypad and display. The Mastercom system is available from Bally Gaming Inc., and is described in U.S. Pat. No. 5,429,361 to Raven et al. incorporated herein by reference. One such currently utilized bus is an EPI bus (Enhanced Player Interface bus), which uses industry standard $I^2C$ hardware and signalling.

In one preferred embodiment, the embedded additional user interface 10 is used to replace/upgrade an EPI bus. Preferably, the embedded additional user interface 10 replaces the EPI bus in the gaming machine in a "plug and play" manner. In other words, the old EPI bus can be unplugged and the new embedded additional user interface 10 can simply be plugged into the $I^2C$ bus of the gaming machine 40, where the user interface 10 utilizes the currently employed industry standard $I^2C$ hardware and signalling without requiring any further modification. The embedded processor 30 of the embedded additional user interface 10 reads incoming $I^2C$ data (content), translates the data into a web authoring language (e.g., HTML, DHTML, XML, MACROMEDIA FLASH), and maps the data to the web page display screen 20. In this manner, the previous $I^2C$ data messages, which were typically presented on a 2-line, 20 character VF display, are automatically transformed by the embedded additional user interface 10 into an attention grabbing, animated (multimedia) web page style format. This results in enhanced player satisfaction and excitement with extremely minimal retrofitting requirements.

Since, in one preferred embodiment, the embedded additional user interface 10 utilizes $I^2C$ hardware and signalling, this enables the user interface 10 to speak and understand the $I^2C$ protocol message set, and thus, communicate directly with the gaming processor 60 of the gaming machine 40 (or other networked devices) in the same fashion in which the gaming processor previously communicated with the EPI bus. Accordingly, in a preferred embodiment, the functionality of the previously-utilized hardware (e.g., the EPI bus) is replaced and substantially upgraded with the integration of the embedded additional user interface 10 into the gaming machine 40. As such, the external hardware of any such system components (e.g., a keypad and a 2-line, 20 character VF display) is eliminated.

As stated above, in one preferred embodiment, the incoming data received by the embedded additional user interface 10 is $I^2C$ signalling protocol; however, in other preferred embodiments other serial communication protocols (or electronic communication format) are utilized. Preferably, the embedded processor 30 communicates with the gaming processor 60, and/or other connected devices, over an $I^2C$ bus (or over another serial communications bus in embodiments that utilize another protocol). The web page display screen 20 of the embedded additional user interface 10 is preferably a color-graphic touch screen display. Preferably, the embedded processor 30 is at least a 32-bit processor. A preferred embodiment utilizes a 32-bit processor because cryptographic techniques, such as SHA-1 and DSA algorithms, are written and operate natively on a 32-bit system. Additionally, the Microsoft® Windows® environment, which is utilized in some preferred embodiments, is also 32-bit. Further, the internal operating system of the embedded additional user interface 10 is preferably customized to match the specific hardware to which the internal operating system attaches.

Preferably, the embedded additional user interface 10 is an embedded computer board that, in addition to the embedded processor 30 and the web page display screen 20, further includes a removable COMPACT FLASH card 75 (or other memory storage device), as shown in FIG. 1, and a network adapter port. Content and feature updates to the embedded additional user interface 10 are accomplished by physically swapping out the COMPACT FLASH card 75 (or other memory storage device). Thus, in order to retrieve data from the embedded additional user interface 10, the data is accessed by physically removing and reading the COMPACT FLASH card 75.

In one preferred embodiment, the internal operating system utilized by the embedded processor 30 of the embedded additional user interface 10 is WINDOWS® CE version 4.2 (or higher). Preferably, the embedded additional user interface 10 is built upon a PXA255-based board developed by the Kontron Corporation. Additionally, in a preferred embodiment of the embedded additional user interface 10, the browser control for the web page display screen 20 is MICROSOFT® INTERNET EXPLORER® 6.0 (or higher), which is shipped standard with WINDOWS® CE 4.2, the preferred internal operating system for the embedded processor 30.

A preferred embodiment of the embedded additional user interface 10 also provides a mechanism for inputting system information into, and retrieving system information from, the game machine 40. As stated above, the embedded additional user interface 10 preferably uses industry standard $I^2C$ hardware and signalling. The $I^2C$ protocol has multi-master capabilities, i.e., is capable of participating as both a slave and as a master. The embedded additional user interface 10 enables system information (such as information input by a player into a web page display screen 20) to be sent from the game machine 40 to a slot system network (or to another destination location). Likewise, the embedded additional user interface 10 also enables the system information (such as display messages) to be sent from the systems network (or from another source location) to the game machine 40 for viewing by the player through the web page display screen 20.

In a preferred embodiment, information can also be input by a user into the web page display screen 20 of the user interface 10. The web page display screen 20 of the user interface 10 employs a virtual keypad. Further, the user interface 10 uses a keypad dictionary that allows a user to be able to enter a vastly greater amount of information than was previously possible using a 12 digit VF keypad. For example, the virtual key on the touch screen that is displayed by the browser is pressed by a user. This calls the Keypad object by calling its Dispatch interface with a string that identifies which virtual key was pressed. The Keypad object looks up the string in the Dictionary object which has been loaded at initialization time with a set of keys to return when that string is passed to it. When it retrieves this set of zero or more key characters, it passes them to the GMU by calling the interface exposed by the object.

Typically, a network interface (or equivalent system) is used to control the flow of funds used with the gaming machine 40 within a particular casino. By utilizing the embedded additional user interface 10, the gaming network interface can be instructed to move funds between player's accounts and gaming devices by merely touching the web page display screen 20. In addition, many other more sophisticated commands and instructions may be provided. Thus, the embedded additional user interface 10 improves the player and casino employee interface to the gaming machine 40, directly at the gaming device itself.

In a preferred embodiment, the web page display screen 20 of the embedded additional user interface 10 enables a player to be shown player messages in an animated, multimedia, web content style environment. These messages would previously have been displayed in a significantly more mundane format on a separate display device (e.g., a 2-line VF display device). In some preferred embodiments, touch screen buttons in the web page display screen 20 are used by the player to navigate between windows in web page display screen 20 and allow access to system functions such as cashless withdraw, balance requests, system requests, points redemption, and the like. In other preferred embodiments, the web page display screen 20 utilizes various other data input techniques commonly known in the art, instead of the touch screen data entry. Thus, implementation of the embedded additional user interface 10 is an efficient, highly beneficial, and substantial upgrade to a gaming machine 40 that greatly increases the functionality over what was previously possible using an EPI bus.

In one preferred embodiment, text data messages are translated into web page navigation requests by the embedded processor 30 and then displayed on the web page display screen 20. Script languages, such as JAVA SCRIPT and VB SCRIPT, are also utilized for some of the web pages. Preferably, the embedded additional user interface 10 emulates the 12-digit keypad and the 2×20 VF display on the web page display screen 20, which has touch screen capabilities. In this embodiment, commands that were previously displayed on the 2×20 VF display are matched to a corresponding URL, and a browser is used to render the page on the web page display screen 20. The web pages displayed contain touch-screen keys that effectively emulate hardware keys.

In one preferred embodiment, a dictionary URL approach is used for translating the data messages into web page information. In this manner, data messages are "looked up" in a dictionary data file where they can be redirected to an attractive URL. The embedded processor 30 responds to requests on the $I^2C$ bus that were intended for the prior art enhanced player interface (EPI) VF display. The web page display screen 20 is not a passive display device like traditional PC monitors, but rather the display screen 20 must respond to commands with text type responses. These requests include initialization requests, status requests, and display requests. As each text data message to be displayed is passed into the embedded processor 30, the processor 30 calls a URL Dictionary to look up a URL with which to replace the text data message. Once the substitution is complete, the embedded processor 30 instructs the web page display screen 20 to present (or navigate to) the appropriate web page.

Accordingly, a URL Dictionary component is used to map a text string, sent from the embedded processor 30 and intended for the display on the 2×20 VF display, to a URL that can be used to display a much more visually-enhanced graphical representation of the same message. Thus, the URL Dictionary component contains a listing of the possible text messages to be supported that could be sent from the embedded processor 30, and a mapping to a set of the desired eye-catching, web content to be displayed on the web page display screen 20. In the event that a message is not in the URL Dictionary, such a message is mapped to a page that substitutes for the 2-line mode.

In the preferred embodiments described above, the embedded processor 30 of the embedded additional user interface 10 reads incoming $I^2C$ data messages, translates the $I^2C$ data messages into a web authoring language (e.g., HTML, DHTML, XML, MACROMEDIA FLASH), and maps the newly-translated web page data message to the web page display screen 20. Additionally, the embedded additional user interface 10 can also read incoming data messages that are already in a web authoring language (e.g., HTML, DHTML, XML, MACROMEDIA FLASH), and map this web page data to the web page display screen 20. Further, and highly advantageously, a preferred embodiment also allows casinos that are using the embedded additional user interface 10 to design and use their own content, thereby giving the casinos the ability to decide what the web page presented on the web page display screen 20 of the user interface 10 will look like.

Figure 3:
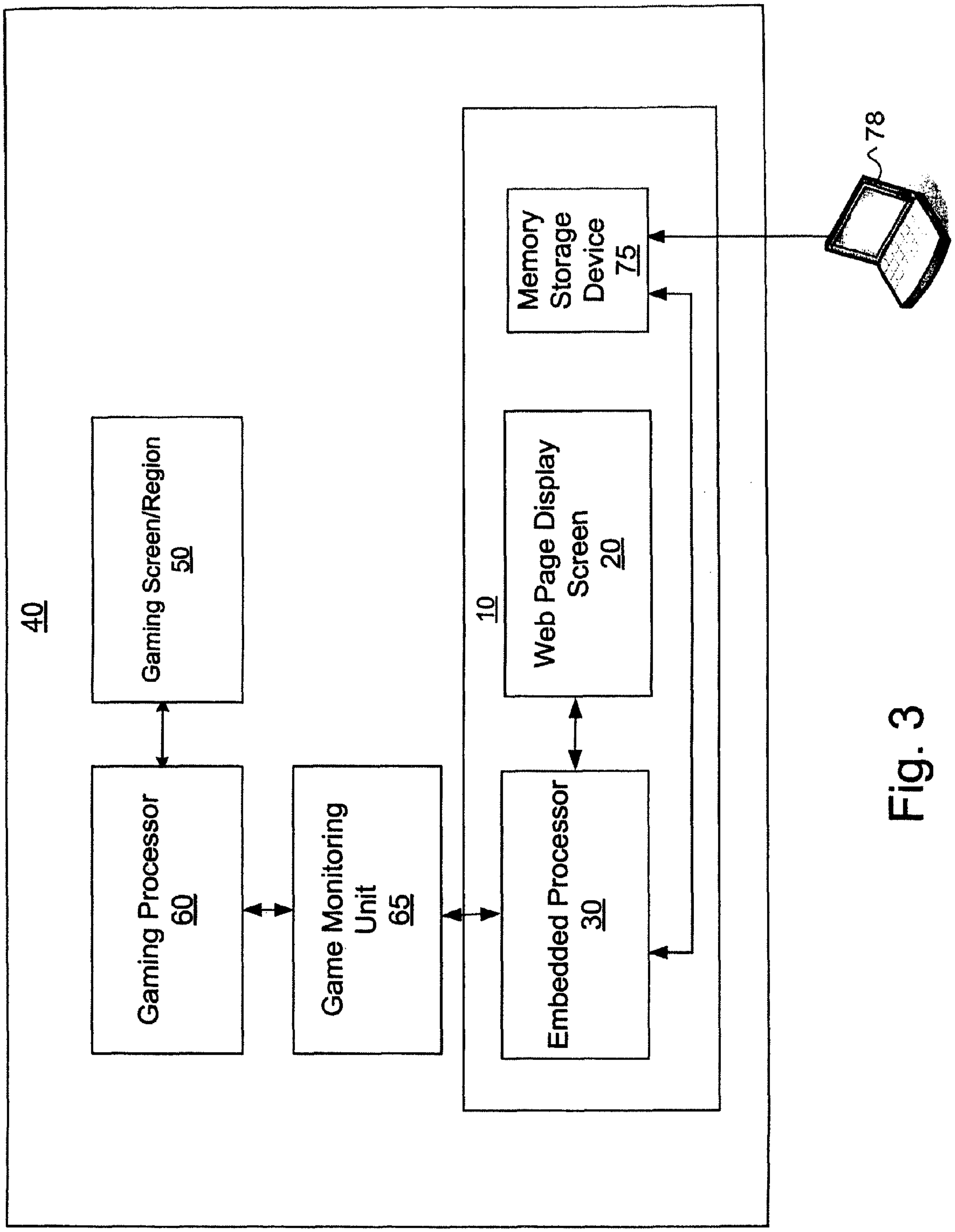
FIG. 3 illustrates a relational diagram of an embedded user interface, constructed in accordance with the disclosed embodiments, utilizing a display screen and an embedded processor that receives cryptographically certified web page content from a portable computer via a network adapter port.

Referring now to FIG. 3, in this preferred embodiment, content may be locally downloaded. Specifically, in one preferred embodiment, the content is updated through a physical USB (or other connection) that is used to download the new content. In one preferred embodiment, the data on the COMPACT FLASH card 75 can be accessed by connecting a separate computer 78 to the network adapter port of the embedded additional user interface 10. This embodiment allows updating the contents of the operating system, changing the operating system itself, and receiving data from the Compact Flash card 75. Physical removal of the COMPACT FLASH card 75 is also an option for updating and inspection of files on the embedded additional user interface 10.

In one preferred embodiment, a portable computer is used to store and publish data content to the COMPACT FLASH card 75 on the embedded additional user interface 10, as well as to receiving data from the COMPACT FLASH card 75 on the embedded additional user interface. In this embodiment, all content on the embedded additional user interface 10 is authenticated as if it were a gaming machine.

In another preferred embodiment, a network adapter port is run on the embedded computer board of the user interface 10. This embodiment also includes a boot loader. Further, in this embodiment, the portable computer 78 (described above) includes components for use in uploading data to, and downloading data from, the COMPACT FLASH card 75 on the embedded additional user interface 10. Specifically, the components that run on the portable computer 78 are for moving new data content to the embedded additional user interface 10, and for validation and verification of the data content that is on the embedded additional user interface. Preferably, all data that is used to update the COMPACT FLASH card 75 moves to or from the embedded additional user interface 10 over the single built in network adapter port on the board.

Prior to the advent of the embedded additional user interface 10, gaming regulators would have been unwilling to allow casino operators to design their own content. However, due to the cryptographic technology implemented by the embedded processor 30 in the embedded additional user interface 10, a certification process is provided by the disclosed embodiments with sufficient security for gaming regulators to allow casino operators to design their own content. Specifically, in one preferred embodiment, the certification process offered ensures authentication and non-repudiation of the casino operator-designed web content. Preferably, the certification process provided further ensures auditability and traceability. Various cryptographic technologies, such as authentication and non-repudiation (described herein below), are utilized in preferred embodiments, to provide sufficient security for gaming regulators to allow casino operators to design their own content.

In one preferred embodiment, this certification process is used to certify "signed content" (created by the casino owners) in the same manner that a "signed program" is certified. Preferably, PKI (Public Key Infrastructure) is utilized in the certification process. PKI is a system of digital certificates, Certificate Authorities, and other registration authorities that verify authenticity and validity. In one preferred embodiment, a "new tier" or second PKI is created that is rooted in the primary PKI and that leverages the capabilities of the certificate (e.g., a x509 certificate) that allow for limited access. Thus, this preferred embodiment allows the attributes within the certificate to be used to provide "levels" of code access and acceptance in the gaming industry.

In one embodiment, the content is protected by digital signature verification using DSA (Digital Signature Algorithm) or RSA (Rivest-Shamir-Adleman) technology. In this regard, the content is preferably protected using digital signature verification so that any unauthorized changes are easily identifiable. A digital signature is the digital equivalent of a handwritten signature in that it binds an individual's identity to a piece of information. A digital signature scheme typically consists of a signature creation algorithm and an associated verification algorithm. The digital signature creation algorithm is used to produce a digital signature. The digital signature verification algorithm is used to verify that a digital signature is authentic (i.e., that it was indeed created by the specified entity). In another embodiment, the content is protected using other suitable technology.

In one preferred embodiment, a Secure Hash Function-1 (SHA-1) is used to compute a 160-bit hash value from the data content or firmware contents. This 160-bit hash value, which is also called an abbreviated bit string, is then processed to create a signature of the game data using a one-way, private signature key technique, called Digital Signature Algorithm (DSA). The DSA uses a private key of a private key/public key pair, and randomly or pseudo-randomly generated integers, to produce a 320-bit signature of the 160-bit hash value of the data content or firmware contents. This signature is stored in the database in addition to the identification number.

In another preferred embodiment, a Message Authentication Code (MAC) is utilized. A Message Authentication Code is a specific type of message digest in which a secret key is included as part of the fingerprint. Whereas a normal digest consists of a hash (data), the MAC consists of a hash (key+data). Thus, a MAC is a bit string that is a function of both data (either plaintext or ciphertext) and a secret key. A Message Authentication Code is attached to data in order to allow data authentication. Further, a MAC may be used to simultaneously verify both the data integrity and the authenticity of a message. Typically, a Message Authentication Code (MAC) is a one-way hash function that takes as input both a symmetric key and some data. A symmetric-key algorithm is an algorithm for cryptography that uses the same cryptographic key to encrypt and decrypt the message.

A Message Authentication Code can be generated faster than using digital signature verification technology; however, a Message Authentication Code is not as robust as digital signature verification technology. Thus, when speed of processing is critical the use of a Message Authentication Code provides an advantage, because it can be created and stored more rapidly than digital signature verification technology.

In one preferred embodiment, the authentication technique utilized is a bKey (electronic key) device. A bKey is an electronic identifier that is tied to a particular individual. In this manner, any adding, accessing, or modification of content that is made using a bKey for authentication is linked to the specific individual to whom that bKey is associated. Accordingly, an audit trail is thereby established for regulators and/or other entities that require this kind of data or system authentication.

Another preferred embodiment of the verification system utilizes "component bindings" for verification using cryptographic security. In component binding, some components come equipped with unalterable serial numbers. Additionally, components such as web content or the game cabinet may also be given another random identification number by the owner. Other components in the system, such as the CMOS memory in the motherboard, the hard drive, and the non-volatile RAM, are also issued random identification numbers. When all or some of these numbers are secured together collectively in a grouping, this protected grouping is referred to as a "binding." Each component of the machine contains its portion of the binding.

In one such preferred embodiment, every critical log entry made to the content is signed with a Hashed Message Authorization Code (HMAC) that is based on the entry itself, and on the individual binding codes. In this manner, the security produced by the bindings ensures that log entries that are made cannot be falsified or repudiated.

After the critical gaming and/or system components are selected, given individual identifiers, and combined into a protected grouping that is secured using the component "bindings," any changes to those components will then be detected, authorized, and logged. For example, content within the binding is digitally signed (SHA-1) using the key derived from the bindings. This signature is verified whenever an entry is made to a component within the binding. If the signature is wrong, this security violation and the violator are noted, but typically the entry is not prohibited. In other embodiments, the entry may be prohibited as well. Thus, the component binding produces a cryptographic audit trail of the individuals making changes to any of the components within the binding.

Moreover, bindings ensure that the critical components of a gaming machine system, or the content utilized therein, that have been selected to be components within the binding have not been swapped or altered in an unauthorized manner. Preferably, bindings use unique identification numbers that are assigned to vital parts of the gaming platform including, by way of example only, and not by way of limitation, the cabinet, motherboard, specific software, non-volatile RAM card, content (data), and hard drive. These identification numbers combined in a cryptographic manner to form a "binding" that protects and virtually encloses the included components, such that no component within the binding can be modified, removed, or replaced without creating an audit trail and requiring authentication. Thus, for one of these components within the binding to be changed, appropriate authentication is required and a log file entry is made documenting the activity and the identity of the individual making the change. In one preferred embodiment, a specific level of bKey clearance or classification is required to make specific changes.

Figure 4:
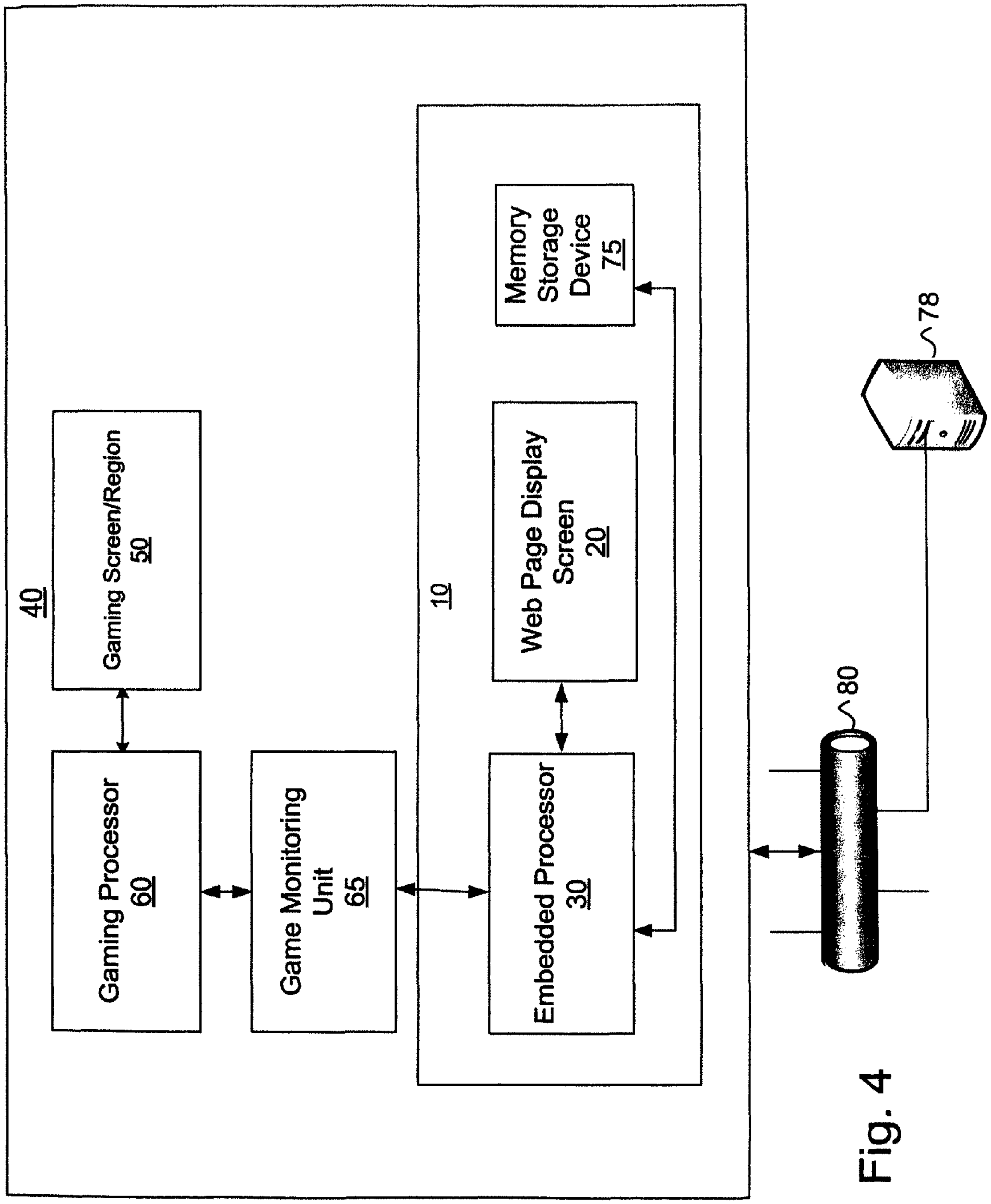
FIG. 4 illustrates a relational diagram of an embedded user interface, constructed in accordance with the disclosed embodiments, utilizing a display screen and an embedded processor that receives web page content from a back-end server via an Ethernet-networked backbone.

Referring now to FIG. 4, in one preferred embodiment, the embedded additional user interface 10 connects to an Ethernet-networked backbone 80 instead of a local system network. Currently, casino networks are not Ethernet, but rather are smaller, more simplistic local system networks. Thus, in this Ethernet-networked backbone 80 embodiment, the current system network is replaced by an industry standard Ethernet backbone, such as 10/100 base T Ethernet running over Cat 3, 4, 5, 6, or higher. Thus, a standard 10/100 base T Ethernet card is added to the processor in this embodiment. Preferably, the network employs TCP/IP, HTTP, and XML messaging or a variant of XML. Nevertheless, any suitable protocol may be used.

Further, in another preferred embodiment, the embedded additional user interface 10 connects to a full featured, back end, download configuration server 90 through the above-described Ethernet-networked backbone 80 as shown in FIG. 4. In such an embodiment, the full-featured server 90 can schedule downloads of content (gaming or otherwise) as well as upload information from the gaming machines 40, such as what options the gaming machines 40 currently possess. Accordingly, in a preferred embodiment, the primary use of the server 90 is as data download and data retrieval server. While this server 90 does upload and download web content style information, it is typically not connected to the World Wide Web. This server 90 must be authenticated (just like a gaming machine) to make the content served to the embedded additional user interface 10 acceptable to the gaming regulators. Preferably, utilization of the Ethernet-networked backbone 80 and the server 90 provides many system benefits, including but not limited to reliability, maintainability, security, content staging, content testing, deployment procedures, and incident recovery. In one embodiment, deliverables also preferably include content templates and guidelines for casino owners and operators to create their own web content for deployment to the web server. In one embodiment, the web server 90 has its content authenticated in the same manner as the embedded additional user interface 10 to allow content to be downloaded to the web page display screen 20.

Figure 5:
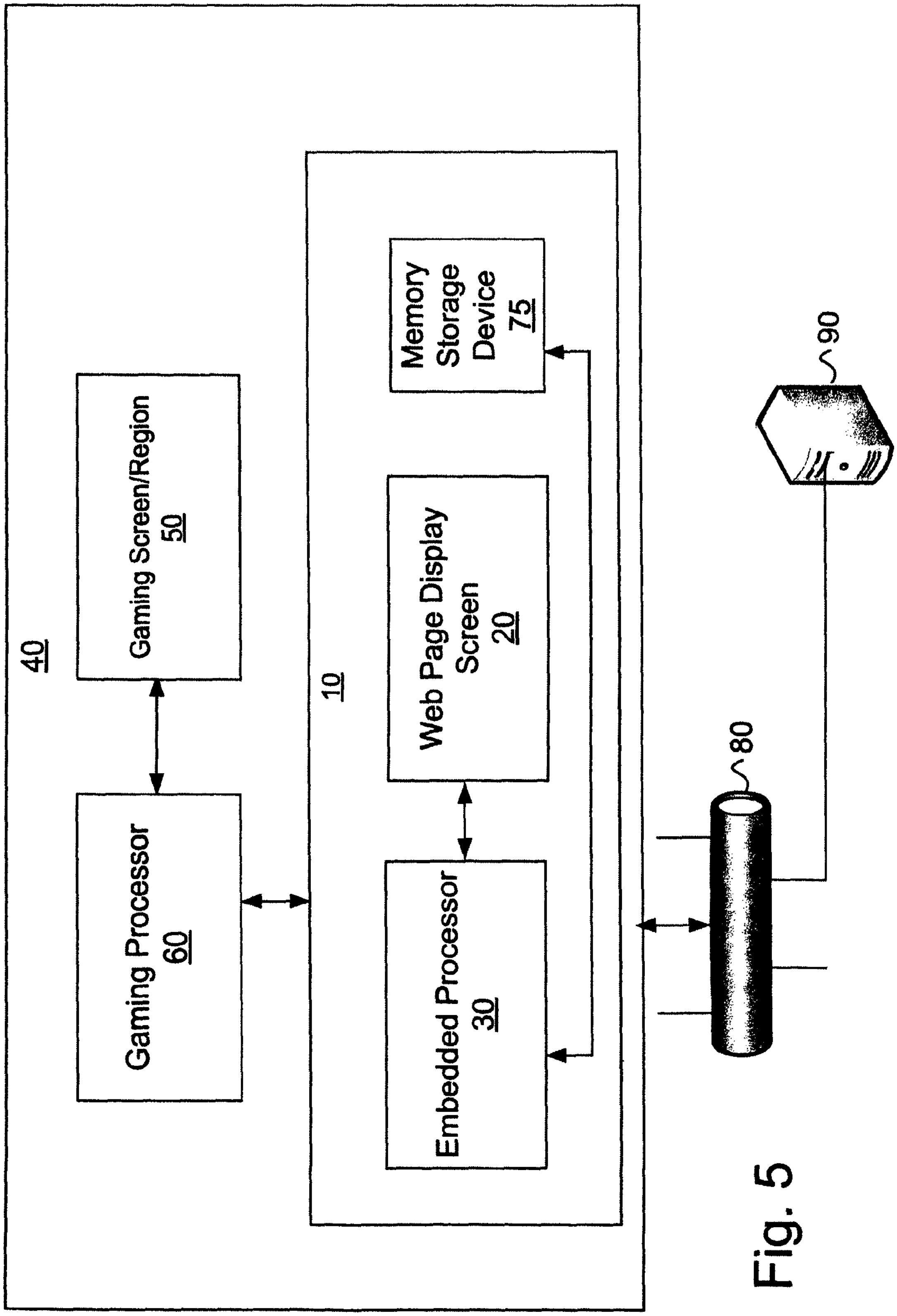
FIG. 5 illustrates a relational diagram of an embedded user interface, constructed in accordance with the disclosed embodiments, utilizing a display screen and an embedded processor that includes the functionality of a standard gaming processor.
Figure 6A:
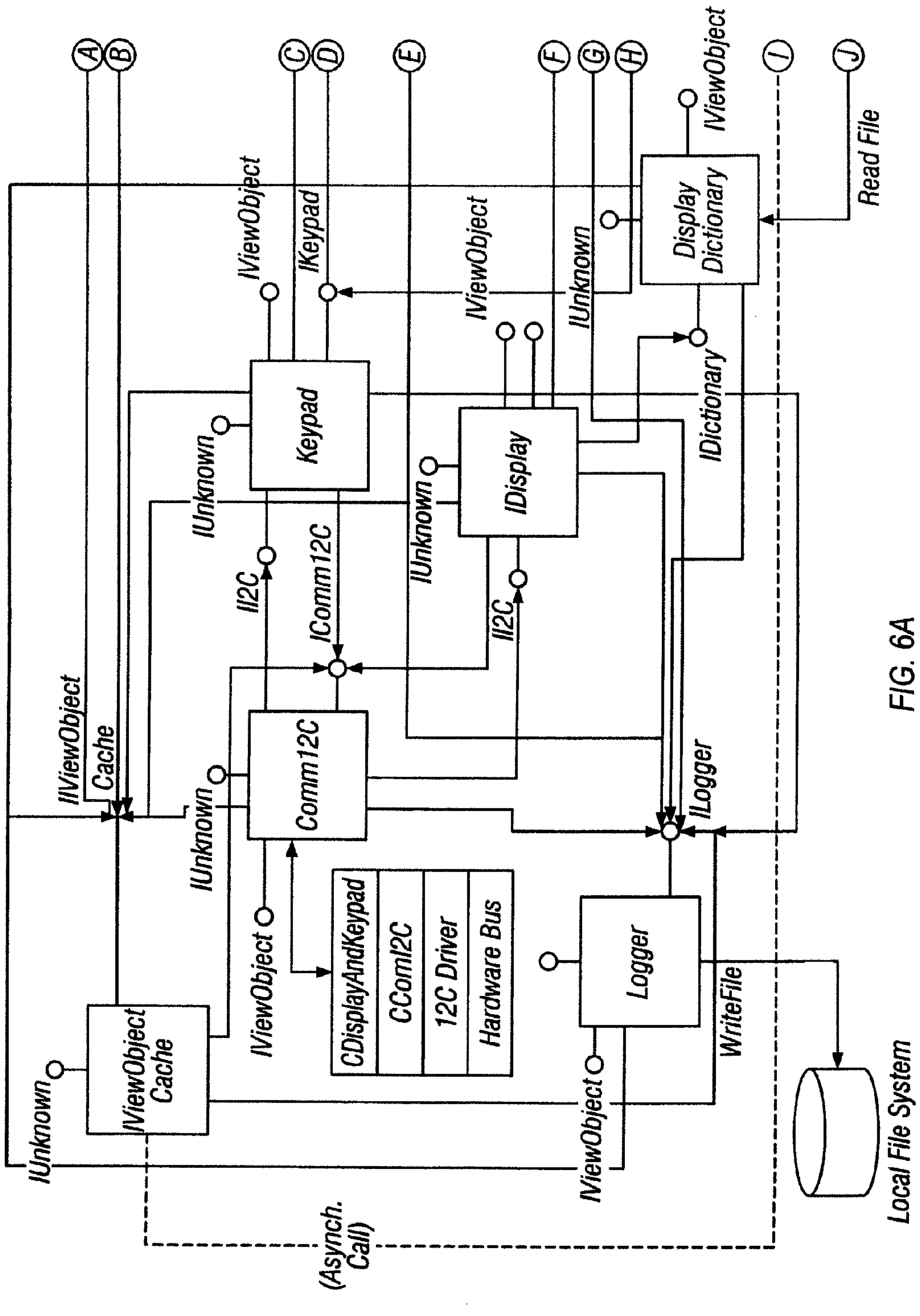
FIG. 6 illustrates an object interaction diagram of an embedded user interface, constructed in accordance with the disclosed embodiments.
Figure 6B:
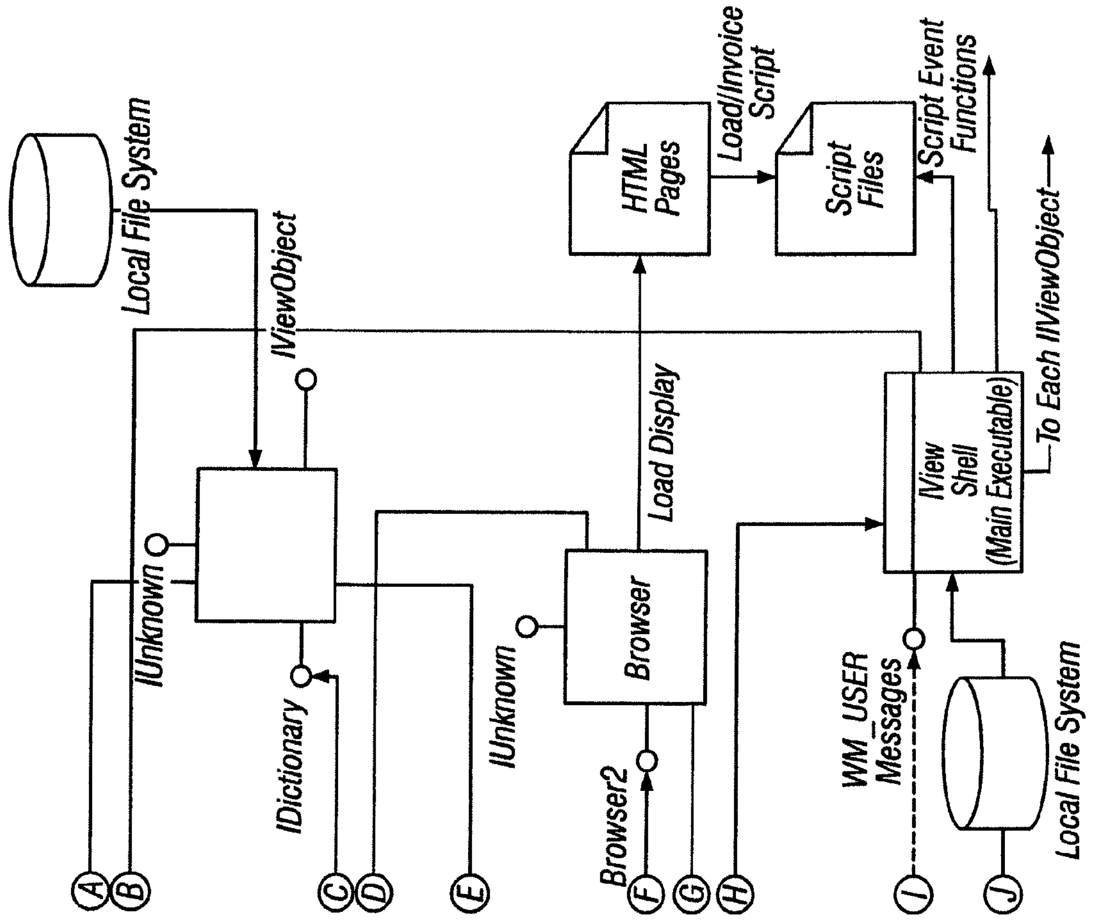
Figure 7:
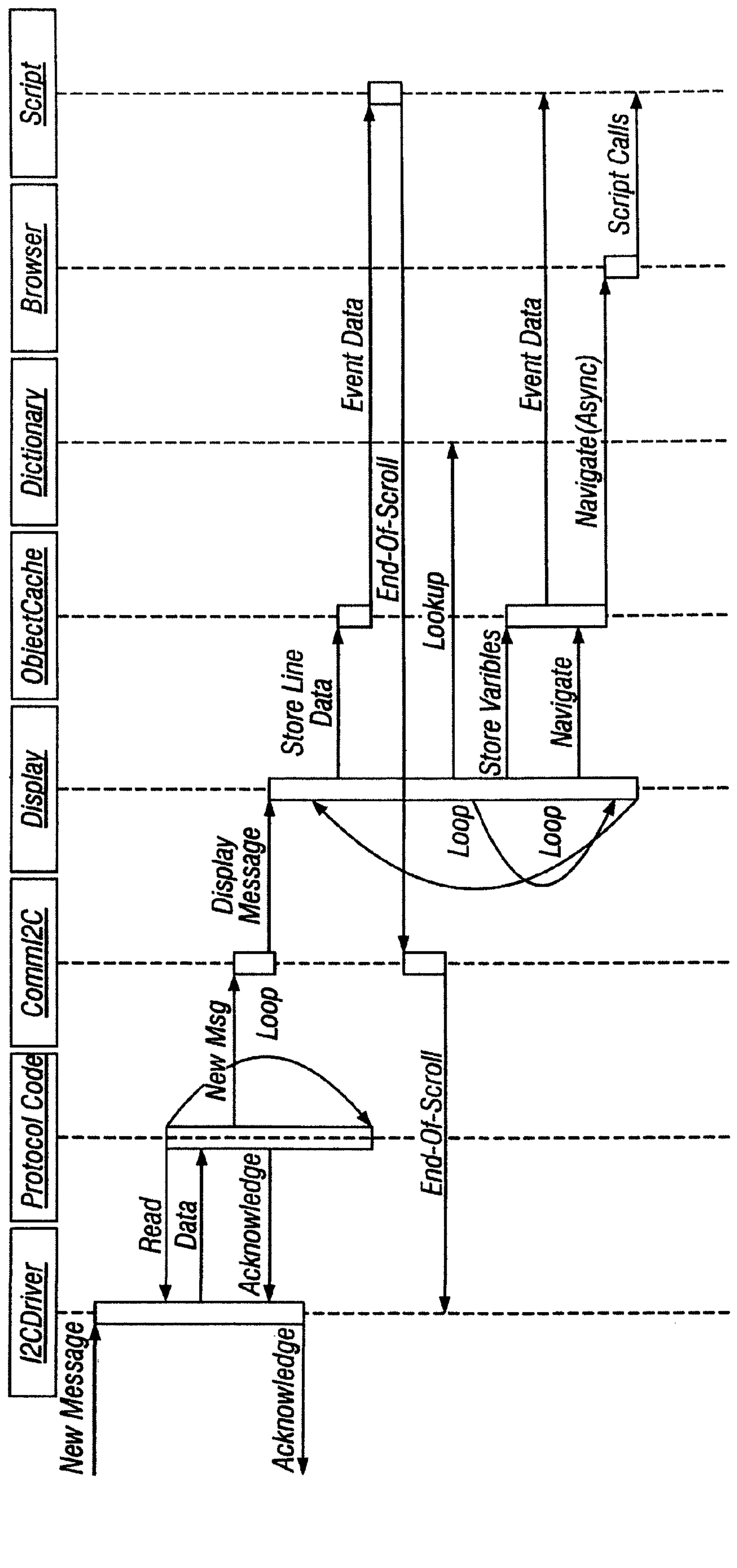
FIG. 7 is a diagram showing the sequence of events that occur when data is sent between the embedded user interface and the game monitoring unit.
Figure 8:
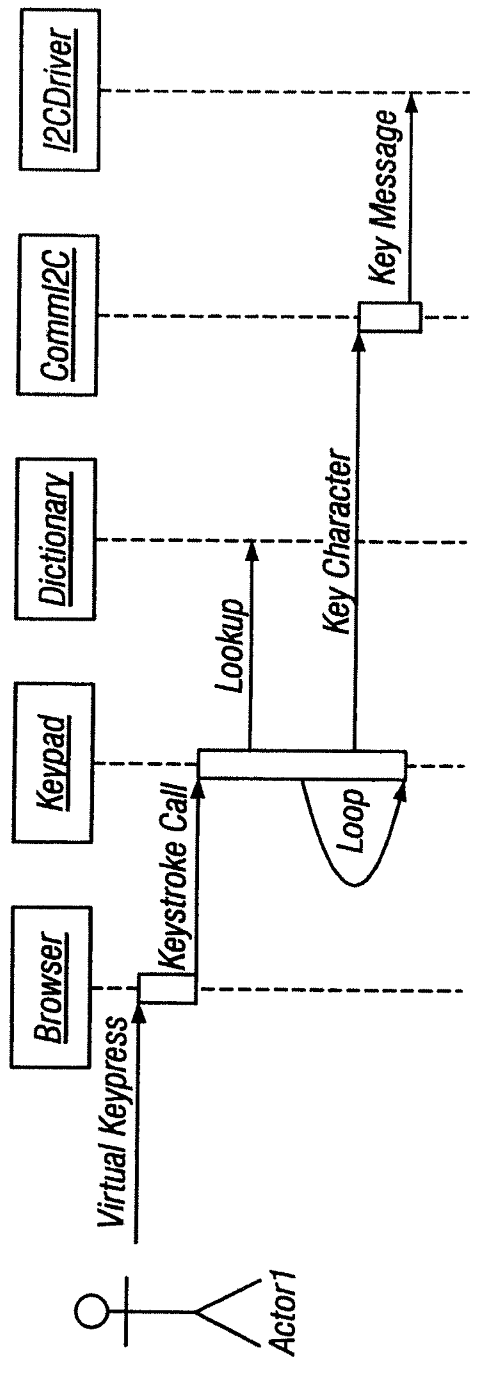
FIG. 8 is a diagram showing the sequence of events that occur when a virtual key is "pressed" on the display screen.

Referring now to FIG. 5, in another preferred embodiment, the functions previously performed by the gaming monitoring unit 65, as shown in FIGS. 1-4, of the gaming machine 40 are supported by the embedded processor 30 of the embedded additional user interface 10. Otherwise stated, the GMU code is transitioned from the gaming monitoring unit 65 into the embedded processor 30 in the embedded additional user interface 10. Accordingly, such a configuration removes the need for the gaming monitoring unit 65 in the gaming machine 40. This results in a significant reduction in the amount and complexity of the hardware, as well as completing a phased transition of more traditional style gaming machines into more modernized upgraded gaming machines.

Thus, such a preferred embodiment is directed towards an embedded additional user interface 10 that is incorporated into a gaming machine 30, the gaming machine in turn including a gaming screen 50 or other appropriate gaming region (e.g., spinning reels), but does not include a gaming monitoring unit 65. Such an embedded additional user interface 10 still includes a web content capable display screen 20 and an embedded processor 30. Once again, the web content capable display screen 20 presents web information to a user via the display screen. The embedded processor 30 preferably utilizes an internal operating system. Furthermore, in this embodiment the embedded processor 30 additionally includes standard gaming monitoring unit functionality (GMU code), since it replaces the gaming monitoring unit 65 in the gaming machine 40. As before, the embedded processor 30 reads incoming data, translates the data into a web protocol (web authoring language), if necessary, and maps the data to the web content capable display screen 20.

In one embodiment, the embedded additional user interface 10, the messages are flashed (e.g., animation, multimedia, and the like) to the player within the web page display screen 20 while the gaming screen 50 is used for game play. These web page style messages can be set at virtually any desired length, format, or style. A message might display, for example, "Welcome to Harrah's Las Vegas! You have 1200 bonus points. Would you like to make a hotel or dinner reservation?" Importantly, while a previous utilized EPI bus would only been capable of scrolling this message in one-quarter inch (0.25") tall monochrome text, in contrast, the web page display screen 20 would "flash" this message in bright red, white, black, and green animated format, on a six inch (6.0") by three inch (3.0") color graphic display. Additionally, in some embodiments, inserting a player identification card into a card reader and/or selecting a player services button activates additional player services functionality.

In one exemplary embodiment of the embedded additional user interface 10 that utilizes a card reader (or other identification technique, such as a player ID code) to recognize a particular player, the web page display screen 20 displays an eye-catching, web page style message to that player, for example, "Welcome, Mr. Smith!" in response to identifying Mr. Smith. Preferably, the web page display screen 20 also has touch screen capabilities that include, by way of example only, and not by way of limitation, "Beverages," "Change," "Services," "Transactions," and "Return to Game." In one embodiment, each of the touch screen icon buttons, when selected, launches a new full screen display within the web page display screen 20 for the player.

For example, in one embodiment, when the "Transactions" touch screen icon button is selected, a new screen is activated that includes the web page style message, "Mr. Smith, Account Balance: Bonus Points=1200, Player Funds=$150, Available Credit=$850, Casino Matching Funds Available=$25," as well as the "Return to Game" icon button 120. As a further example, when the player selects a "Cashless Withdraw" button in another embodiment, a new screen is activated that includes a touch screen keypad and flashes the question, "How much do you want?" as well as "Enter," "Clear," and "Back" buttons. Preferably, this interface also includes an "Information" button that, when selected, launches a new screen within the web page display screen 20 that provides answers to frequently asked questions and other useful information. Moreover, the web page display screen 20 preferably also includes a "History" button that, when selected, launches a new screen within the web page display screen 20 that provides a history log of all transactions and other actions performed on that gaming machine 40.

In accordance with another preferred embodiment, a method is disclosed for increasing user excitement relating to a gaming machine by providing a richer gaming experience via an embedded additional user interface that is incorporated into the gaming machine. The method preferably includes: receiving a serial data message (e.g., an $I^2C$ data message) containing enhanced player information over a serial communication bus (e.g., an $I^2C$) in the embedded additional user interface 10; translating the data message (using the embedded processor 30) into a web authoring language; and mapping the data message to the web page display screen 20, wherein the display screen presents web page information to a user via the display screen.

The potential advantages of utilizing the embedded additional user interface 10 are numerous. These potential advantages include, by way of example only, and not by way of limitation, providing animated and/or multimedia web style content; providing fonts and icons which are larger and more aesthetically appealing; providing special services to players, (e.g., multiple languages, assistance for handicapped individuals); facilitating interactive uses of the web page display screen 20; providing the ability to customize the "look and feel" of the web page display screen 20 for players and casino employees; increased player excitement and participation; and simplified replaceability and/or upgradeability from an EPI bus or other similar non-web page style components.

Although the disclosed embodiments has been described in language specific to computer structural features, methodological acts, and by computer readable media, it is to be understood that the disclosed embodiments defined in the appended claims is not necessarily limited to the specific structures, acts, or media described. Therefore, the specific structural features, acts and mediums are disclosed as exemplary embodiments implementing the disclosed embodiments.

Furthermore, the various embodiments described above are provided by way of illustration only and should not be construed to limit the disclosed embodiments. Those skilled in the art will readily recognize various modifications and changes that may be made to the disclosed embodiments without following the example embodiments and applications illustrated and described herein, and without departing from the true spirit and scope of the disclosed embodiments, which is set forth in the following claims.

What is claimed:

1. An embedded user interface incorporated into a gaming machine, the gaming machine including a gaming presentation and gaming processor, the embedded user interface comprising:

a display screen, wherein the display screen presents web content to a user via the display screen;

a dictionary component, wherein the dictionary component translates an incoming text data message directed to be displayed to a player upon the display screen into an XML, HTML, or DHTML enhanced player message directed to be displayed to the player upon the display screen; and an embedded processor that employs an internal operating system and communicates with the gaming processor, wherein the embedded processor reads the incoming text data message directed to be displayed to the player upon the display screen and calls the dictionary component that enables display of the translated XML, HTML, or DHTML enhanced player message directed to be displayed to the player upon the display screen.

2. The embedded user interface of claim 1, wherein the embedded processor communicates with the gaming processor over an $I^2C$ bus.

3. The embedded user interface of claim 1, wherein the display screen is a color graphic touch screen display.

4. The embedded user interface of claim 1, wherein the embedded processor utilizes cryptographic technology.

5. The embedded user interface of claim 1, wherein the embedded user interface employs a certification process for authentication and non-repudiation of the web content.

6. The embedded user interface of claim 1, wherein the certification process provides auditability and traceability.

7. The embedded user interface of claim 1, wherein the certification process provides cryptographic security to enable casino operators to design certifiable content for display to the players.

8. The embedded user interface of claim 1, wherein the embedded user interface connects to an Ethernet-networked backbone.

9. The embedded user interface of claim 1, wherein the embedded user interface connects to a web server through an Ethernet-networked backbone.

10. A user interface system for use in a gaming machine, the gaming machine including a separate gaming presentation and gaming processor, the user interface system comprising:

a display screen, wherein the display screen presents information to a user via the display screen;

a dictionary component, wherein the dictionary component translates an incoming text data message directed to be displayed to a player upon a display screen into an XML, HTML, or DHTML enhanced player message directed to be displayed to the player upon the display screen; and a processor that employs an internal operating system and communicates with the gaming processor, wherein the embedded processor reads the incoming text data message directed to be displayed to the player upon the display screen and calls the dictionary component that enables display of the translated XML, HTML, or DHTML enhanced player message directed to be displayed to the player upon the display screen.

11. The system of claim 10, wherein the embedded processor communicates with the gaming processor over an $I^2C$ bus.

12. The system of claim 10, wherein the animation capable display screen is a color graphic touch screen display.

13. The system of claim 10, wherein the embedded processor utilizes cryptographic technology.

14. The system of claim 10, wherein the system employs a certification process for authentication and non-repudiation of the presentable information.

15. The system of claim 10, wherein the certification process produces signed content that is auditable and traceable.

16. The system of claim 10, wherein the certification process provides cryptographic security to enable casino operators to design certifiable content for display to the players.

17. The system of claim 10, wherein the embedded enhanced user interface connects to an Ethernet-networked backbone.

18. The system of claim 10, wherein the embedded enhanced user interface connects to a web server through an Ethernet-networked backbone.

19. A gaming machine having a gaming presentation, the gaming machine comprising:

a gaming processor;

a user interface separate from the gaming presentation, the user interface comprising:

a display screen, wherein the display screen presents information to a user via the display screen;

a dictionary component, wherein the dictionary component translates an incoming text data message directed to be displayed to a player upon the display screen into an XML, HTML, or DHTML enhanced player message directed to be displayed to the player upon the display screen; and an additional processor that communicates with the gaming processor, wherein the additional processor reads the incoming text data message directed to be displayed to the player upon the display screen and calls the dictionary component that enables display of the translated XML, HTML, or DHTML enhanced player message directed to be displayed to the player upon the display screen.

20. A method for increasing user excitement relating to a gaming machine by providing an enhanced display of information to a user, the method comprising:

providing an embedded user interface that is incorporated into a gaming machine, wherein the embedded user interface includes an additional processor and a display screen that are separate from the gaming presentation and gaming processor of the gaming machine;

receiving an incoming text data message at the user interface directed to be displayed to a player upon the display screen of the user interface;

using a dictionary component and the additional processor of the user interface to translate the incoming text data message directed to be displayed to the player upon the display screen of the user interface into an XML, HTML, or DHTML enhanced player message; and displaying the translated XML, HTML, or DHTML enhanced player message directed to be displayed to the player upon the display screen of the user interface, wherein the display screen presents the translated XML, HTML, or DHTML enhanced player message to the player via the display screen.

* * * * *

UNITED STATES PATENT AND TRADEMARK OFFICE

CERTIFICATE OF CORRECTION

PATENT NO. : 8,517,830 B2
APPLICATION NO. : 13/110744
DATED : August 27, 2013
INVENTOR(S) : James W. Morrow and Carmen DiMichele It is certified that error appears in the above-identified patent and that said Letters Patent is hereby corrected as shown below:

In the Specification

Column 4, In line 37, replace “manufactures” with --manufacturers--

Column 12, In line 62, replace “has” with --have--

Signed and Sealed this
Third Day of December, 2013

Margaret A. Focarino

Margaret A. Focarino
*Commissioner for Patents of the United States Patent and Trademark Office*